(12) United States Patent
Othman et al.

(10) Patent No.: US 11,090,621 B2
(45) Date of Patent: Aug. 17, 2021

(54) MIXING DEVICE AND METHOD FOR MIXING MEDIA

(71) Applicant: Fraunhofer-Gesellschaft zur Förderung der angewandten Forschung e.V., Munich (DE)

(72) Inventors: Nabih Othman, Musberg (DE); Marcel Daumüller, Leinfelden (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 668 days.

(21) Appl. No.: 15/746,677

(22) PCT Filed: Jul. 21, 2016

(86) PCT No.: PCT/EP2016/067421
§ 371 (c)(1),
(2) Date: Jan. 22, 2018

(87) PCT Pub. No.: WO2017/013212
PCT Pub. Date: Jan. 26, 2017

(65) Prior Publication Data
US 2018/0207594 A1    Jul. 26, 2018

(30) Foreign Application Priority Data

Jul. 22, 2015   (DE) .................... 10 2015 213 871.2

(51) Int. Cl.
*B01F 13/10*        (2006.01)
*B01F 15/02*        (2006.01)
(Continued)

(52) U.S. Cl.
CPC ........ *B01F 13/1055* (2013.01); *B01F 5/0685* (2013.01); *B01F 5/0688* (2013.01);
(Continued)

(58) Field of Classification Search
CPC .... B01F 5/0685; B01F 15/0279; A45D 19/02; A45D 2200/058; F16K 11/0856
See application file for complete search history.

(56) References Cited

U.S. PATENT DOCUMENTS

| 6,402,364 B1 * | 6/2002 | Esclar .................... A45D 19/02 |
| | | 222/135 |
| 7,316,502 B2 * | 1/2008 | Freeman ............. B01F 7/00041 |
| | | 366/316 |
| 2006/0000852 A1 | 1/2006 | Manne |

FOREIGN PATENT DOCUMENTS

| DE | 4124599 C1 | 11/1992 | |
| EP | 0126007 A1 * | 11/1984 | ......... G01N 33/4925 |

(Continued)

OTHER PUBLICATIONS

"Chinese Application No. 201680054695.9, Office Action dated Mar. 31, 2020", w English Translation, (Mar. 31, 2020), 16 pgs.
(Continued)

*Primary Examiner* — Elizabeth Insler
(74) *Attorney, Agent, or Firm* — Schwegman Lundberg & Woessner, P.A.

(57) ABSTRACT

Disclosed are systems and methods for a mixing device having a mixing chamber bounded by an inner surface of a wall, the wall having a cylindrical outer face and at least one feed duct which ends on one side with an opening in the cylindrical outer surface of the wall and on the other side with an opening in the inner surface of the wall. The mixing device also includes a magazine having a cylindrical inner surface, the cylinder axis of which is coaxial with a cylinder axis of the cylindrical outer surface of the wall, and a multiplicity of ducts. The magazine and wall are movable with respect to one another such that the openings of the multiplicity of ducts in the inner surface of the magazine are each connectable in a medium-conducting manner to the (Continued)

opening of the at least one feed duct in the outer surface of the wall.

20 Claims, 4 Drawing Sheets

(51) Int. Cl.
*B01F 11/00* (2006.01)
*B01F 5/06* (2006.01)
*F16K 11/085* (2006.01)

(52) U.S. Cl.
CPC ........ *B01F 11/0082* (2013.01); *B01F 15/026* (2013.01); *B01F 15/0237* (2013.01); *B01F 15/0279* (2013.01); *F16K 11/0853* (2013.01); *F16K 11/0856* (2013.01)

(56) References Cited

FOREIGN PATENT DOCUMENTS

| | | | |
|---|---|---|---|
| EP | 0126007 | A1 | 11/1984 |
| EP | 1040773 | A1 | 10/2000 |

OTHER PUBLICATIONS

"German Application Serial No. 10 2015 213 871.2, Office Action dated May 2, 2016", (dated May 2, 2016), 5 pgs.
"International Application No. PCT/EP2016/067421, International Search Report dated Nov. 3, 2016", w/ English Translation, (dated Nov. 3, 2016), 8 pgs.
"International Application No. PCT/EP2016/067421, Written Opinion dated Nov. 3, 2016", (dated Nov. 3, 2016), 7 pgs.

\* cited by examiner

MIXING DEVICE AND METHOD FOR MIXING MEDIA

PRIORITY APPLICATIONS

This application is a U.S. National Stage Filing under 35 U.S.C. 371 from International Application No. PCT/EP2016/067421, filed on 21 Jul. 2016, and published as WO2017/013212 on 26 Jan. 2017, which claims the benefit of priority to German Application No. 10 2015 213 871.2, filed on 22 Jul. 2015; which applications and publication are incorporated herein by reference in their entirety.

The invention relates to a mixing device and a method for mixing media, with which different media can be mixed together, avoiding cross-contamination.

Various systems for mixing low-, medium- and high-viscosity media are known from the prior art. However, these systems are designed for large quantities and are not economical for the production of small individual quantities, since the cleaning effort, maintenance and costs are too high.

Therefore, it is the object of the present invention to specify a mixing device and a method for mixing media, with which even small and individual quantities of media are miscible economically.

The object is achieved by the mixing device according to claim 1 and the method for mixing media according to claim 17. The respective dependent claims specify advantageous developments of the mixing device according to the invention and of the method according to the invention.

The mixing device according to the invention first of all has a mixing chamber which is bounded by an inner surface of a wall in at least some directions. In those directions in which the mixing chamber is not bounded by the inner surface of the wall, the mixing chamber can be bounded by other structures, which will be discussed further in the following. According to the invention, the wall has a cylindrical outer surface. The outer surface does not have to extend parallel to the inner surface, but may advantageously do so. The wall has at least one feed duct which ends on one side with an opening in the cylindrical outer surface of the wall and on the other side with an opening in the inner surface of the wall. The feed duct thus extends through the wall and ends in openings in the inner surface and the outer surface. The fact that the duct ends with an opening in the outer surface or inner surface of the wall means that a face of the corresponding opening lies at the surface of the corresponding wall. In particular configurations, the feed duct can be continued by a connecting duct. Advantageously, however, the duct in the inner surface of the wall leads into the mixing chamber via this opening.

Optionally, in addition to said feed duct, an additional feed duct can be provided. The latter can advantageously lead into the mixing chamber at a greater distance from the end surface of the mixing chamber than said feed duct. Advantageously, this further feed duct can have a larger diameter than said feed duct, such that, per unit time, greater volumes, for example of a basic material, are able to be introduced into the mixing chamber. Advantageously, the further feed duct is offset with respect to said feed duct by an angle about the cylinder axis of the outer surface of the wall, such that the feed ducts are able to be opened independently of one another. Alternatively, it is also possible for no duct to be present in the magazine, at the level of said feed duct in the direction of the cylinder axis, at that angle at which the further feed duct leads into the mixing chamber.

According to the invention, the mixing device has a magazine which has a cylindrical inner surface, the cylinder axis of which is coaxial with a cylinder axis of the cylindrical outer surface of the wall of the mixing chamber. Advantageously, the cylindrical inner surface of the magazine surrounds the cylindrical outer surface of the wall in a non-vanishing region in the direction of the cylinder axis of the cylindrical outer surface.

The cylindrical inner surface of the magazine can abut the cylindrical outer surface of the wall, but it is also possible for elements to be provided between the magazine and the wall, for example a sealing ring. If, for example, a sealing ring is provided between the cylindrical inner surface of the magazine and the cylindrical outer surface of the wall, said sealing ring preferably abuts the cylindrical inner surface of the magazine and the cylindrical outer surface of the wall. The wall does not necessarily have to consist of a homogeneous material, and so a sealing ring surrounding the mixing chamber can also be considered part of the wall. Said feed duct through the wall can then advantageously also extend through that structure that surrounds the wall, i.e. for example through the sealing ring.

According to the invention, the magazine has a multiplicity of ducts. Each of the ducts extends from in each case one port to in each case one opening in the cylindrical inner surface of the magazine. Therefore, the magazine has, for each of the ducts, a port and an opening in the cylindrical inner surface of the magazine. A port is understood here as being an opening of the corresponding duct. Advantageously, the ducts can extend radially to the cylinder axis of the cylindrical inner surface of the magazine, such that the ports are each introduced in a radial direction in an outer surface of the magazine.

In an advantageous configuration, the magazine can be formed in an annular manner with a rectangular cross section. In this case, the magazine thus has a cylindrical inner surface and a cylindrical outer surface, extending parallel thereto, with a cylinder axis coaxial with the cylinder axis of the inner surface and is bounded on both sides by planar parallel surfaces in the direction of the cylinder axes.

According to the invention, the magazine and the wall which bounds the mixing chamber are movable with respect to one another such that the openings of the multiplicity of ducts in the inner surface of the magazine are each able to be connected in a medium-conducting manner to the opening of the at least one feed duct in the outer surface of the wall. The magazine and wall are thus rotatable with respect to one another and/or displaceable in the direction of the cylinder axis, such that the at least one feed duct in the wall is able to be connected in a medium-conducting manner to in each case one of the ducts in the magazine. In this case, the corresponding opening of the magazine duct in the inner surface of the magazine is moved to the opening of the feed duct in the outer surface of the wall or an outer surface of a structure which surrounds the wall and in which the feed duct is continued, such that the opening faces lie directly on one another and a medium-conducting connection is established between the corresponding magazine duct and the feed duct. The two mutually adjoining openings of the ducts in this case advantageously adjoin one another so tightly that sealing between the surfaces in which the openings are present is ensured, and so the medium to be conducted cannot pass between the corresponding surfaces.

According to the invention, the mixing device also has a mixer which is arranged in the mixing chamber and is movable along the cylinder axis of the outer surface of the wall in order to mix media which are present in the mixing chamber. The mixing can therefore take place by the mixer being moved in said direction.

In an advantageous configuration of the invention, the opening of the at least one feed duct in the inner surface of the all can adjoin a fixed end surface of the mixing chamber, said end surface being surrounded by the inner surface of the wall. In this case, the mixing chamber is thus bounded by the inner surface of the wall on one side and by said fixed end surface on the other side. In this configuration, a periphery of the opening in the inner surface of the wall can advantageously be in contact with a periphery of said end surface. Figuratively speaking, the opening can thus be arranged entirely at the end of the mixing chamber. As a result, it is possible to mix very small volumes of media.

Advantageously, during said movement, the annular magazine and the wall can be rotatable with respect to one another and/or be displaceable with respect to one another in the direction of the cylinder axis of the outer surface of the wall. It is thus possible for a degree of freedom in rotation and advantageously also a degree of freedom in translational movement in the direction of the cylinder axis to exist between the magazine and the outer surface of the wall. Advantageously, the magazine and the wall are not movable with respect to one another in the radial direction with regard to the cylinder axis of the outer surface of the wall. The magazine thus slides advantageously on the outer surface of the wall.

As a result of the configuration according to the invention, it is possible to introduce media from different magazine ducts successively into the feed duct and as a result into the mixing chamber. To this end, the corresponding duct in the magazine is able to be connected in a medium-conducting manner to the feed duct, as described above. After the corresponding medium has been introduced into the mixing chamber, it is possible, by moving the magazine and the outer surface of the wall with respect to one another, to connect a different duct of the magazine to the feed duct and to introduce the medium from this duct into the mixing chamber.

The present invention is employable particularly advantageously when the magazine has at least 4 ducts, preferably at least 8 ducts, particularly preferably at least 12 ducts. It is then possible to mix a correspondingly large number of different media with one another.

It is possible and advantageous to configure the invention such that, during the movement from one port to the next port, the opening of the feed duct in the outer surface of the wall passes over openings of magazine ducts from which no medium is intended to be introduced into the mixing chamber. In order to prevent the corresponding medium from passing into the feed duct during such passing over of the openings, it is possible for the magazine ducts each to have at least one valve with which the inflow of medium through the corresponding duct is controllable.

It is also possible to move the magazine and the wall with respect to one another such that other ports are not passed over during the movement from one port to the next port through which a medium is intended to be passed in a particular case. To this end, it is possible, for example, during the displacement in the direction of the cylinder axis, for the opening of the feed duct in the outer surface of the wall to be moved past the openings of those ducts from which no medium is intended to be introduced into the mixing chamber.

Advantageously, the mixing device can be configured such that in each case one medium is present in a pressurized manner in the magazine ducts. Such pressurization can be brought about for example by pumps or a raised arrangement of corresponding storage containers. In an advantageous configuration, the magazine ducts can each have a valve with which the flow of medium is able to be regulated. If the feed ducts have valves, the pressurization is preferably present on that side of the corresponding duct that is remote from the opening in the inner surface of the magazine, as far as the valve. In order to introduce the corresponding medium into the mixing chamber, the valve can then be opened and/or the corresponding duct can be connected to the feed duct.

In an advantageous configuration of the invention, the openings of the magazine ducts in the inner surface of the magazine can be arranged in common planes, advantageously in one, two, three or four common planes. The openings can thus be arranged in the form of the ring. The planes are in this case preferably parallel or the rings have preferably parallel planes and are preferably perpendicular to the cylinder axis of the outer surface of the wall.

Particularly preferably, in the event that the openings are arranged in several planes, the openings of adjacent planes or rings can be offset with respect to one another such that the openings are located in the angular direction of a plane between the openings of the corresponding adjacent plane. It is also possible and advantageous for the ports of the magazine ducts to be arranged in two or three planes and for the openings in the inner surface of the magazine to be present in exactly one common plane. In this way, it is possible for even more media to be introduced into the mixing chamber.

The mixing device according to the invention can advantageously have an outlet in an end surface of the mixing chamber, said end surface being fixed with respect to the wall and being perpendicular to the cylinder axis of the outer surface, the media being able to be discharged from the mixing chamber through said outlet. Such an outlet can advantageously have a valve with which the flow of media through the outlet is controllable. In this configuration, the mixing device can thus be considered a flow metering and mixing device. Particularly preferably, the outlet is arranged in the middle of said end surface.

In one advantageous configuration of the invention, the mixer can have a disk which is perpendicular to the cylinder axis of the outer surface. This disk can contain at least one, advantageously several mixing structures through medium can flow from one side of disk to the other side of the disk. If the mixer is then moved through the mixing chamber, as described above, the media present in the mixing chamber flow through the mixing structures and are mixed together as a result.

In one advantageous configuration of the invention, the mixing device can have a piston which bounds the mixing chamber on one side in the direction of the cylinder axis of the outer wall. If the mixing chamber is bounded on one side by a fixed end surface, as described above, the piston can bound the mixing chamber on an opposite side of the mixing chamber from this side. Advantageously, the piston is movable in the direction of the cylinder axis of the outer wall. As a result of the movement of the piston, the volume of the mixing chamber can thus be increased and reduced. In particular, media can be drawn into and/or pushed out of the mixing chamber by the movement of the piston. Advantageously, a periphery of the piston adjoins the inner surface of the wall directly or via a seal.

The piston can advantageously have a vent valve, through which, in an open state, gas can escape from the mixing chamber and which is closable with respect to the through-flow of gas and media. To this end, the vent valve can open and close a duct which extends from a side of the piston that faces the mixing chamber to a side of the piston that is remote from the mixing chamber.

In one advantageous configuration of the invention, the mixer can, as described above, have a disk that is perpendicular to the cylinder axis of the outer surface, said disk containing mixing structures, through which media can flow from one side of the disk to the other side. In order to minimize the dead volumes, the piston can advantageously have a number of molded elements equal to the number of mixing structures, said molded elements being arranged on that side of the piston that faces the mixer such that they completely fill the mixing structures when the piston bears against the disk of the mixer.

Advantageously, the mixing structures can be ducts that narrow in the direction from the piston to the end side or cylindrical ducts, wherein, advantageously, the central axes of the ducts are parallel to the cylinder axis of the outer surface of the wall.

In a corresponding manner, the molded elements can be configured in a conical or cylindrical manner.

In order to ensure the mixing structures are completely filled by the shaped elements, it is advantageous that the mixing structures not have any undercuts as seen from the direction of the piston. Advantageously, the walls of the mixing structures thus approach one another evenly in the direction of the opposite end surface of the mixing chamber from the piston, as seen from the piston, or extend parallel to one another. Cross sections of the mixing structures in a plane in which the disk extends can be configured for example in a circular, star-shaped or cruciform manner or the like.

For particular applications of the mixing device, it may be advantageous for two, three or more of the feed ducts to be provided in the wall. It is then possible for several media to be introduced simultaneously into the mixing chamber or for the movements between the introduction of one medium and the introduction of the next medium to be minimized.

In one advantageous configuration of the invention, the wall can have a sealing cylinder which surrounds the wall. In this case, the outer surface of this sealing cylinder can form at least a part of the cylindrical outer surface of the wall. The at least one feed duct then advantageously also passes through the sealing cylinder. It is possible for the opening of the feed duct in the outer surface of the wall to be present then the one outer surface of the sealing cylinder.

By way of the mixing device according to the invention, liquids, pastes, powders, gases and other media may be miscible. The mixing device can mix for example low-, medium- and high-viscosity media and gases in an advantageously automated manner, and be used for example in the cosmetics, pharmaceutical, medical and food industry.

Also specified according to the invention is a method for mixing media which is carried out with a mixing device as described above.

In order to carry out the method, in an advantageous configuration, the annular magazine and the wall can be moved with respect to one another such that the openings of at least two ducts in the inner surface of the magazine, between which at least one further opening of the duct and the magazine is located, are connected successively in a medium-conducting manner to the opening of the at least one feed duct in the outer surface of the wall. In such a procedure, it is advantageously possible for the opening of the at least one further duct to be passed over by the opening of the feed duct during the movement from one of the at least two openings to the other of the two openings, and in the process for a valve, through which medium is able to be conducted into the at least one further duct, to be closed at least during the passing over.

Alternatively, it is possible for the magazine to be moved with respect to the wall in the direction of the cylinder axis of the outer wall during the movement from one opening to the other, such that the opening of the feed duct is moved past the opening of the at least one further duct during the movement in the angular direction about the cylinder axis.

The method according to the invention is realizable particularly advantageously, but not necessarily, as follows. A basic material is mixed with a plurality of additional materials. For mixing, first of all the feed duct is connected to a magazine duct through which a basic material is introduced. The feed duct is then moved to a further magazine duct, through which a first additional material is introduced. Subsequently, the feed duct is moved back to that magazine duct through which the basic material is introduced and a little basic material is introduced such that the feed duct is cleaned of the first additional material. Subsequently, the feed duct can be moved to a third magazine duct, through which a second additional material is introduced. Subsequently, the feed duct can be moved back to the first duct, through which the basic material is introduced, in order to clean the feed duct by means of basic material. If necessary, this process can be repeated as often as desired with further additional materials. The feed duct is always connected to the duct for basic material and then a duct for an additional material is connected to the feed duct. Subsequently, for cleaning, the basic material duct is reconnected to the feed duct.

If the mixing is not contamination-critical, the method can advantageously also be carried out as follows. A basic material is mixed with several additional materials. For mixing, here too, first of all the feed duct is connected to a magazine duct through which a basic material is introduced. The feed duct is then moved to a further magazine duct, through which a first additional material is introduced. Subsequently, the feed duct can then be moved, without previously being moved to the first duct, to a third magazine duct, through which a second additional material is introduced. Subsequently, the feed duct can optionally be moved back to the first duct again, through which basic material is introduced, in order to clean the feed duct by means of basic material. If necessary, it is also possible to repeat this operation as often as desired with further additional materials.

The operation of introducing medium through the ducts can be in each case as follows. First of all, said mixer can bear against said end surface of the mixing chamber and the piston can bear against the mixer, wherein molded elements of the piston can be located in mixing structures of the mixer. In this state, the mixing chamber has a volume of essentially zero. The feed duct can then be connected in a medium-conducting manner to one of the magazine ducts and the corresponding medium can be introduced into the mixing chamber. In the process, the piston and the mixer move away from the end surface to such an extent that the volume of the mixing chamber increases to the volume of the introduced medium. A further magazine duct can then be connected in a medium-conducting manner to the feed duct and again a corresponding medium can be introduced into the mixing chamber. The piston and the mixer can again move away from the end surface of the mixing chamber such that the volume of the mixing chamber increases by the volume of introduced medium.

In an alternative configuration, it is also possible for the piston to already be at a distance from the end surface before the first medium is introduced. During the introduction of medium, a vent valve in the piston can then be opened in this way, air can be pushed out of the mixing chamber through the valve in the piston by the introduced medium.

In both configurations of the media supply, after all of the media have been fed, the mixer can be moved in the direction of the cylinder axis of the outer surface of the wall, with the result that the media in the mixing chamber are mixed. After the mixing process has been completed, the contents of the mixing chamber, i.e. the mixed media, can be metered out, for example through an opening in the end surface. To this end, the piston can be moved in the direction of the end surface. If the mixer and the piston and the end surface finally bear against one another, the mixing chamber is completely empty.

The invention will be explained by way of example in the following text with reference to a number of figures. Identical reference signs in this case identify identical or corresponding features. The features shown in the examples can also be combined between the examples and realized independently of the specific example. Features which occur multiple times are identified with reference signs only sometimes, in order to increase clarity. The statements given for the characterized features also apply to the other, equivalent features.

Figure 1:
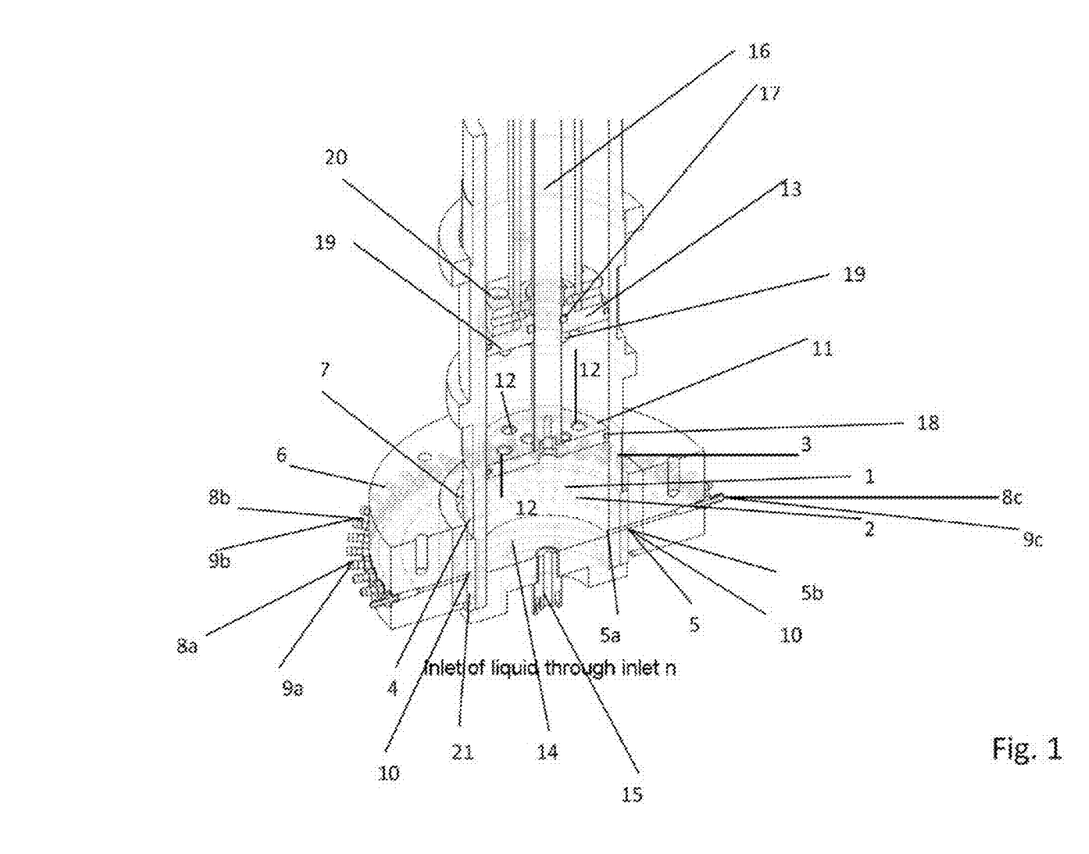
FIG. 1 shows a section through a mixing device according to the invention.

FIG. 1 shows a mixing device according to the invention. The mixing device has a mixing chamber 1 which is bounded by an inner surface 2 of a wall 3. The wall 3 also has a cylindrical outer surface 4. The wall 3 contains at least one feed duct 5, which ends with an opening 5a in the inner surface 2 of the wall on one side and with an opening 5b in the cylindrical outer surface 4 of the wall 3 on the other side.

The mixing device also has a magazine 6 which has a cylindrical inner surface 7, the cylinder axis of which is coaxial with a cylinder axis of the cylindrical outer surface 4 of the wall 3.

The magazine 6 has a multiplicity of ducts 8a, 8b, 8c, which each extend from a port 9a, 9b, 9c to in each case one opening 10 in the cylindrical inner surface 7 of the magazine 6.

The magazine 6 and the wall 3 are movable with respect to one another such that the openings 10 of the multiplicity of ducts 8a, 8b, 8c in the inner surface 7 of the magazine 6 are each connectable in a medium-conducting manner to the opening 5b of the feed duct 5 in the outer surface 4 of the wall 3.

In the example shown in FIG. 1, the mixing device also has a mixer 11 which is movable in the mixing chamber 1 along the cylinder axis of the outer surface 4 of the wall 3 in order to mix media. The mixer 11 has mixing structures 12, through which medium can flow from one side to the other of a disk of the mixer 11.

In the example shown in FIG. 1, the mixing structures 12 are cylindrical bores through the plate of the mixer 11, having cylinder axes parallel to the cylinder axis of the outer surface 4.

In the example shown, the mixing device also has a piston 13, which is movable along the cylinder axis of the outer surface 4 of the wall 3. Together with a fixed end surface 14, the piston 13 bounds the mixing chamber 1. The plate 11 of the mixer moves between the piston 13 and the end surface 14.

In order to meter media present in the mixing chamber 1, the mixing device has an opening 15 in the end surface 14 in the example shown. Through this opening, media present in the mixing chamber 1 can be discharged by means of the piston 13. In the example shown, the opening 15 is arranged in the middle of the end surface 4.

In the example shown in FIG. 1, the mixer 11 is moved by means of a rod 16, which is arranged centrally on the mixer 11 on that side that is remote from the end surface 14. The rod 16 extends through a central opening in the piston 13. The opening is sealed off with respect to the passage of media by sealing elements 17.

In the example shown, the mixer 11 is advantageously sealed off by means of a sealing ring 18 with respect to the wall 2 which bounds the mixing chamber 1.

On its side facing the mixing chamber and the mixer 11, the piston. 13 has molded elements 19 which are configured such that, when the plate 11 of the mixer bears against the piston 13, the molded elements 19 completely fill the mixing structures 12.

In the example shown, the piston 13 also has a vent valve 20 which extends from that side of the piston 13 that bounds the mixing chamber to that side of the piston 13 that is remote from the mixing chamber 1 and is closable with respect to the throughflow of gases and media.

In the example shown, a sealing ring 21 is arranged between the wall 3 and the inner surface 7 of the magazine 6, said sealing ring 21 extending around the wall 3 in contact therewith and bearing against the inner wall 7 of the magazine. Here too, the sealing element 21 can be considered part of the wall 3. The duct 5 thus extends through an inner part, facing the mixing chamber 1, of the wall 3 and through the sealing element 21 as far as the opening 5b, where the feed duct adjoins the inner surface 7 of the magazine or an opening 10 of a duct 8a, 8b, 8c.

In the example shown in FIG. 1, the magazine 6 is configured as a ring with a square cross section. The ducts 8a, 8b, 8c are straight and extend in a radial direction through the annular body of the magazine 6. In the example shown in FIG. 1, the individual ducts are arranged equidistantly from one another in a common plane which is perpendicular to the cylinder axis of the inner surface 2 of the wall 3.

Figure 2:
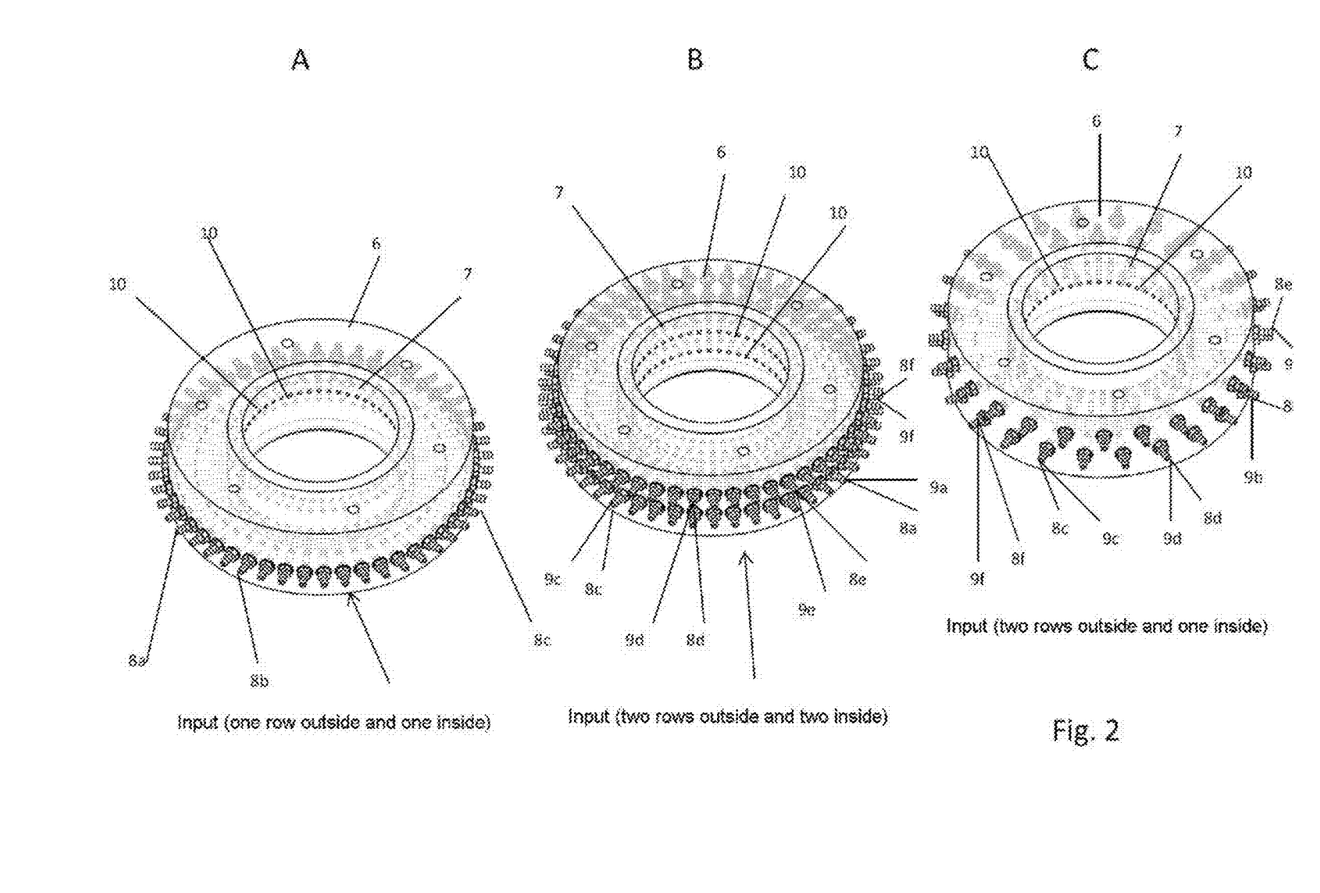
FIG. 2 shows various configurations of a magazine according to the invention.

FIG. 2 shows various possible configurations of the magazine 6 as can be used in the invention. The configuration shown in FIG. 2A corresponds to the one shown in FIG. 1. All the ducts 8a, 8b, 8c are arranged in a common plane and equidistantly in the angular direction. In particular, all the openings 10 of the multiplicity of magazine ducts in the inner surface 7 are located in a common plane which is perpendicular to the cylinder axis of the cylindrical outer surface 4 of the wall 3.

FIG. 2B shows an alternative configuration of the magazine 6, in which the multiplicity of ducts 8a, 8b, 8c, 8d, 8e, 8f are arranged in precisely two common planes which are perpendicular to the cylinder axis of the cylindrical outer surface 4 of the wall 3. In this case, twice as many ducts can be provided as in FIG. 2A. As a result of such an arrangement of the ducts 8a to 8f, it is possible, with a given circumference of the magazine 6, to provide more ducts 8a to 8f than in an arrangement in only one plane. Both the openings 10 and the ports 9a to 9f are distributed in two planes here. In a direction parallel to the cylinder axis, in each case two ducts are arranged alongside one another in the example shown in FIG. 2B.

FIG. 2C shows a further possible configuration of a magazine 6 as can be used in the invention. In the example shown in FIG. 2C, the ports of the ducts 8a to 8f are arranged in precisely two planes. Those openings 10 in the inner surface 7 of the magazine 6 that face the wall 3 are arranged in precisely one common plane, however. If the density of the openings 10 in the inner surface 7 of the magazine 6 is not intended to be increased compared with an arrangement of the ports 9a to 9f in a single plane, as shown in FIG. 2A, it is possible, as shown in FIG. 2C, to arrange in each case only one port 9a to 9f in an angular direction. The ports of the adjacent planes are offset in an angular direction with respect to one another.

Figure 3:
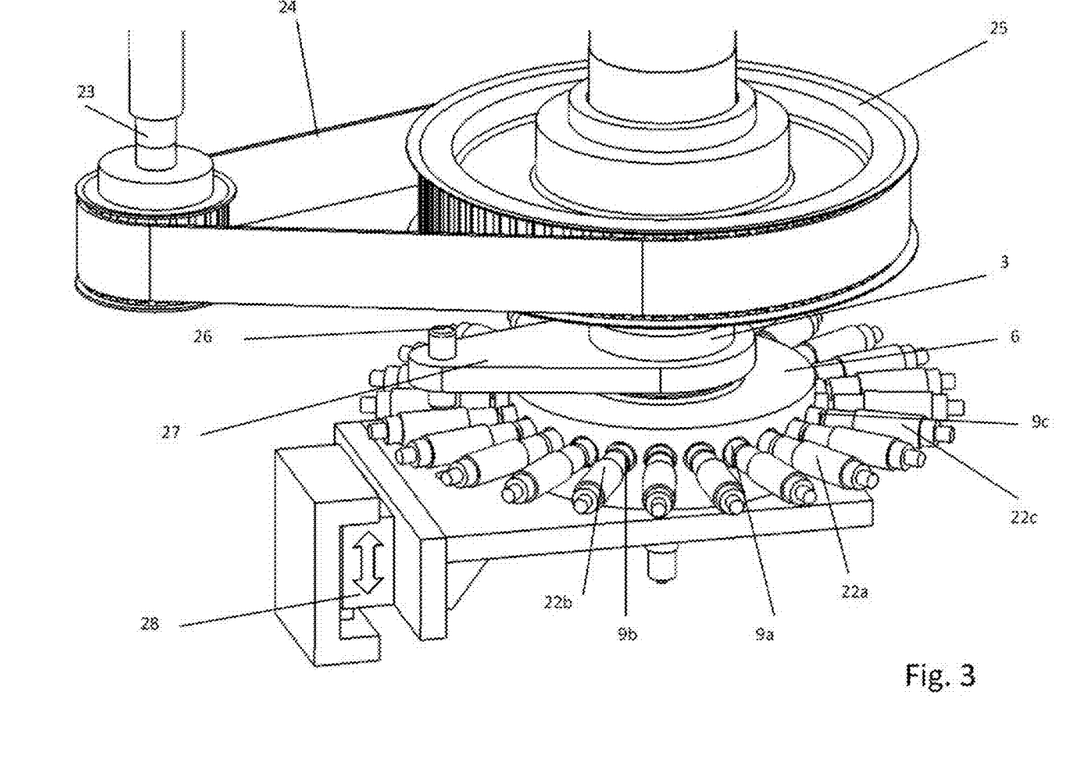
FIG. 3 shows a device for moving the magazine with respect to the wall.

FIG. 3 shows a mixing device according to the invention, in which the inflow of media through the ducts 8a to 8f is controlled by means of solenoid valves 22a, 22b and 22c. In this configuration of the invention, all the outlet openings 10 in the inner surface 7 of the magazine 6 can be arranged in a single plane, since, when openings 10 are passed over by the feed duct 5, medium only passes into the feed duct 5 when the corresponding valve 22a, 22b or 22c is open.

In the example shown in FIG. 3, the magazine 6 is rotatable with respect to the wall 3 by means of a drive 23, the torque of which is transmitted by means of a belt 24 to an output wheel 25 surrounding the wall 3. In the example shown, the device for controlling the solenoid valves 22a, 22b and 22c has a magnet 26 which is arranged on an arm 27. The arm 27 is fixedly connected to the wall 3 of the mixing chamber and, upon rotation of the wall 3, is moved therewith. As seen from the mixing chamber 1, the magnet 26 can be arranged in that angular direction in which the feed duct 5 extends. In this way, by way of the magnet 26, it is possible to open that solenoid valve 22a, 22b, 22c which closes the duct that is connected in a medium-conducting manner to the feed duct 5.

In the example shown in FIG. 3, the mixing device has a translation device 28, by means of which the magazine 6 is displaceable in an axial direction in the direction of the cylinder axis of the wall 3. As a result of this displacement in the direction of the cylinder axis, it is possible for the magnet 26 not to act on those solenoid valves which are passed over when heading for an feed duct 8a, 8b, 8b from which no medium is intended to be introduced into the mixing chamber 1. Furthermore, such a displacement can have the effect that the opening 5b, as shown in FIG. 1, is moved past those openings 10 of ducts 8a to 8f from which no medium is intended to be passed into the mixing chamber 1.

It should be noted that a configuration as shown in FIG. 3 can also be readily realized in such a way that the wall 3 is axially displaced and the magazine 9 is rotated by a drive device 23.

Figure 4:
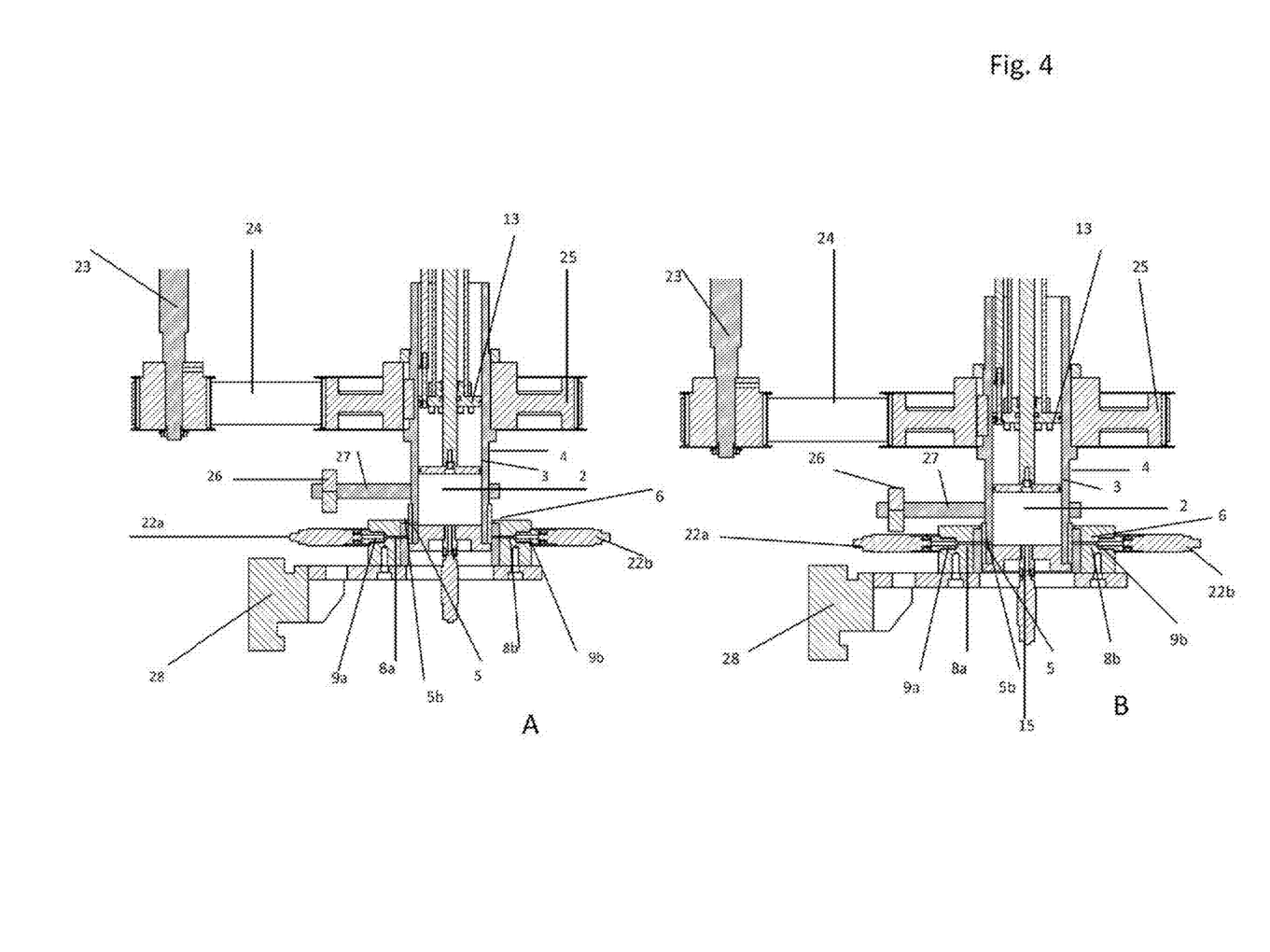
FIG. 4 shows a section through the device shown in FIG. 3.

FIG. 4 shows the configuration of the invention shown in FIG. 3 in section. The inner part of the mixing device within the ports 9a, 9b and the wall 3 corresponds to the example shown in FIG. 1, and so reference is made to the description there.

The drive device 23 having a V belt 24 and output wheel 25 corresponds to the embodiment shown in FIG. 3. Likewise, the valves 22a, 22b and the magnet 26 are configured as shown in FIG. 3.

FIG. 4A shows the configuration, shown figure, of the mixing device in a state in which no medium is introduced into the feed duct 5. To this end, the magazine 6 is pushed downward, i.e. away from the piston 13, in the direction of the cylinder axis of the wall 3. As a result, the opening 5b of the feed duct 5 is located above the duct 8a in the axial direction. Furthermore, the magnet 26 is far enough away from the corresponding solenoid valve 22a for the latter to remain closed in this position, the mixing chamber can be rotated with the wall 3 about the cylinder axis and moved to a duct 8a, 8b without passing over other ducts 8a, 8b.

In FIG. 4B, compared with FIG. 4A, the magazine 6 has now been moved in the axial direction toward the piston 13, such that the duct 8a adjoins the opening 5b of the feed duct and the duct 8a is connected in a medium-conducting manner to the feed duct 5. In the process, the valve 22a was moved toward the magnet 26, with the result that the solenoid valve 22a of the duct 8a is opened.

In the device shown in FIGS. 3 and 4, any one of the ducts 8a, 8b, 8c can be approached without passing over other ducts 8a, 8b, 8c. To this end, the magazine 6 is displaced in the axial direction with respect to the wall 3, then rotated about the cylinder axis of the wall 3 and, when the feed duct is located above the duct 8a, 8b, 8c to be headed for, displaced back in the axial direction.

The media are able to be fed to the ports 9a to 9f of the ducts 8a to 8f in the magazine 6 for example via hoses. They can be pressurized for example by means of pumps, such that they are present under pressure as far as the corresponding valve and pass through the valve when the latter is opened.

The research work which resulted in these results was sponsored by the European Union.

The invention claimed is:

1. A mixing device comprising:
   a mixing chamber bounded by an inner surface of a wall, wherein the wall also includes a cylindrical outer surface,
   wherein the wall defines at least one feed duct that ends on one side with an opening in the cylindrical outer surface of the wall and on another side with an opening in the inner surface of the wall,
   wherein the mixing device furthermore includes a magazine that includes a cylindrical inner surface, the cylindrical inner surface defining a cylinder axis which is coaxial with a cylinder axis of the cylindrical outer surface of the wall,
   wherein the magazine includes a plurality of ducts, wherein each duct of the plurality of ducts extends from a port to an opening in the cylindrical inner surface of the magazine, respectively,
   wherein the magazine and the wall are movable with respect to one another such that the opening of each duct of the plurality of ducts in the inner surface of the magazine is capable of being connected in a medium-conducting manner to the opening of the at least one feed duct in the outer surface of the wall,
   wherein the mixing device also includes a mixer that is configured to be moved in the mixing chamber along the cylinder axis of the outer surface of the wall in order to mix media,
   wherein at least two openings of the plurality of ducts of the magazine are arranged in exactly two planes, or at least three openings of the plurality of ducts of the magazine are arranged in exactly three planes, in the inner surface of the magazine, said planes being perpendicular to the cylinder axis of the cylindrical outer surface of the wall.

2. The mixing device according to claim 1, wherein the opening of the at least one feed duct in the inner surface of the wall adjoins an end surface of the mixing chamber, said end surface being surrounded by the inner surface of the wall and being fixed with respect to the wall.

3. The mixing device according to claim 1, wherein the magazine includes an annular magazine, and wherein the annular magazine and the wall are at least one of rotatable with respect to one another about the cylinder axis of the outer surface of the wall or are displaceable with respect to one another in a direction of the cylinder axis of the outer surface of the wall.

4. The mixing device according to claim 1, wherein the magazine contains at least 4 ducts.

5. The mixing device according to claim 1, wherein at least two openings of the plurality of ducts of the magazine are arranged in a common plane in the inner surface of the magazine, said plane being perpendicular to the cylinder axis of the cylindrical outer surface of the wall.

6. The mixing device according to claim 1, having an outlet that is arranged in an end surface of the mixing chamber, said end surface being fixed with respect to the wall and being perpendicular to the cylinder axis of the outer surface, and through which outlet media are able to be discharged from the mixing chamber.

7. The mixing device according to claim 1, wherein the mixer has a disk that is perpendicular to the cylinder axis of the outer surface, the disk including a mixing structure, through which media can flow from one side of the disk to the other side.

8. The mixing device according to claim 1, including a piston that bounds the mixing chamber on one side in a direction of the cylinder axis of the outer wall, said side being located opposite an end surface of the mixing chamber, said end surface being fixed with respect to the outer wall, and which the piston is movable in the direction of the cylinder axis of the outer wall.

9. The mixing device according to claim 8, wherein the piston includes a vent valve, through which, in an open state, gas is capable of escaping from the mixing chamber and which is closable with respect to a throughflow of a gas and a medium.

10. The mixing device according to claim 9, wherein the mixer includes a disk that is perpendicular to the cylinder axis of the outer surface, said disk including at least one mixing structure, through which media can flow from one side of the disk to the other side, wherein the piston has at least one shaped element, said shaped element being arranged on a side of the piston that faces the mixer, wherein the piston has as many shaped elements as mixing structures, and wherein the at least one shaped element is arranged such that it completely fills the at least one mixing structure when the piston bears against the disk of the mixer.

11. The mixing device according to claim 10, wherein the at least one mixing structure is a duct that narrows in the direction from the piston to the end side or ducts with parallel walls, the axes of which are parallel to the cylinder axis of the outer surface of the wall.

12. The mixing device according to claim 1, wherein the at least one duct of the magazine includes a valve through which a valve media is capable of being conducted into the at least one duct of the magazine and with which an inflow of the media into the at least one duct is capable of being regulated.

13. The mixing device according to claim 1, wherein the mixing device includes two or three feed ducts.

14. The mixing device according to claim 1, wherein the wall includes a sealing cylinder that surrounds the mixing chamber, wherein an outer surface of the sealing cylinder forms at least a part of the cylindrical outer surface of the wall, and wherein the at least one feed duct passes through a cylinder wall of the sealing cylinder.

15. The mixing device according to claim 1, wherein the media is at least one of a liquid, a paste, a powder, or a gas.

16. A method for mixing media, wherein the method comprises:
receiving media, for mixing, in a mixing device including a mixing chamber, the mixing chamber bounded by an inner surface of a wall that also includes a cylindrical outer surface,
wherein the wall defines at least one feed duct that ends on one side with an opening in the cylindrical outer surface of the wall and on the other side with an opening in the inner surface of the wall,
wherein the mixing device furthermore includes a magazine that includes a cylindrical inner surface, the cylindrical inner surface defining a cylinder axis which is coaxial with a cylinder axis of the cylindrical outer surface of the wall,
wherein the magazine includes a plurality of ducts, wherein each duct of the plurality of ducts extends from a port to an opening in the cylindrical inner surface of the magazine,
wherein the magazine and the wall are movable with respect to one another such that the opening of each duct of the plurality of ducts in the inner surface of the magazine is capable of being connected in a medium-conducting manner to the opening of the at least one feed duct in the outer surface of the wall,
wherein the mixing device also includes a mixer; and
for mixing media, the mixer in the mixing chamber is moved along the cylinder axis of the outer surface of the wall,
wherein at least two openings of the plurality of ducts of the magazine are arranged in exactly two planes, or at least three openings of the plurality of ducts of the magazine are arranged in exactly three planes, in the inner surface of the magazine, said planes being perpendicular to the cylinder axis of the cylindrical outer surface of the wall.

17. The method for mixing media according to claim 16, comprising moving the magazine and the wall with respect to one another such that the openings of at least two ducts in the inner surface of the magazine, between which at least one further opening of a duct of the magazine is located, are connected successively in a medium-conducting manner to the opening of the at least one feed duct in the outer surface of the wall,
wherein either the opening of the at least one further duct is passed over by the opening of the feed duct during a movement from one of the at least two openings to the other of the at least two openings, and a valve, through which medium is conducted into the at least one further duct, is closed at least during the passing over, or the magazine is moved with respect to the wall in a direction of the cylinder axis of the outer wall during the movement from one of the at least two openings to the other of the at least two openings, such that the magazine is moved past the opening of the at least one further duct during the movement in an angular direction about this cylinder axis.

18. The method according to claim 16, wherein, in a first step, the opening of the feed duct is connected to a first duct of the magazine from which a basic material is introduced into the mixing chamber, in a second step, the feed duct is connected to a second duct of the magazine through which a first additional material is introduced into the mixing chamber, in a third step, the feed duct is connected to a third duct of the magazine through which a second additional material is introduced into the mixing chamber, and in a fourth step, the feed duct is reconnected to the first duct of the magazine through which the basic material is introduced into the mixing chamber.

19. The method according to claim 18, wherein, in a step that is carried out between the second and the third step, the feed duct is reconnected to the first duct of the magazine through which the basic material is introduced into the mixing chamber.

20. The method according to claim 18, wherein the second step and also the step between the second and the third step are repeated for at least one further additional material.

\* \* \* \* \*